Nov. 15, 1955     H. J. TALBOT     2,723,760
APPARATUS FOR DECLARIFICATION TREATMENT
OF SOLIDS CARRYING LIQUIDS

Filed Oct. 30, 1952     4 Sheets-Sheet 1

Fig. I.

INVENTOR
Henry J. Talbot
BY William J. Fox
ATTORNEY

INVENTOR
Henry J. Talbot
BY William J. Fox
ATTORNEY

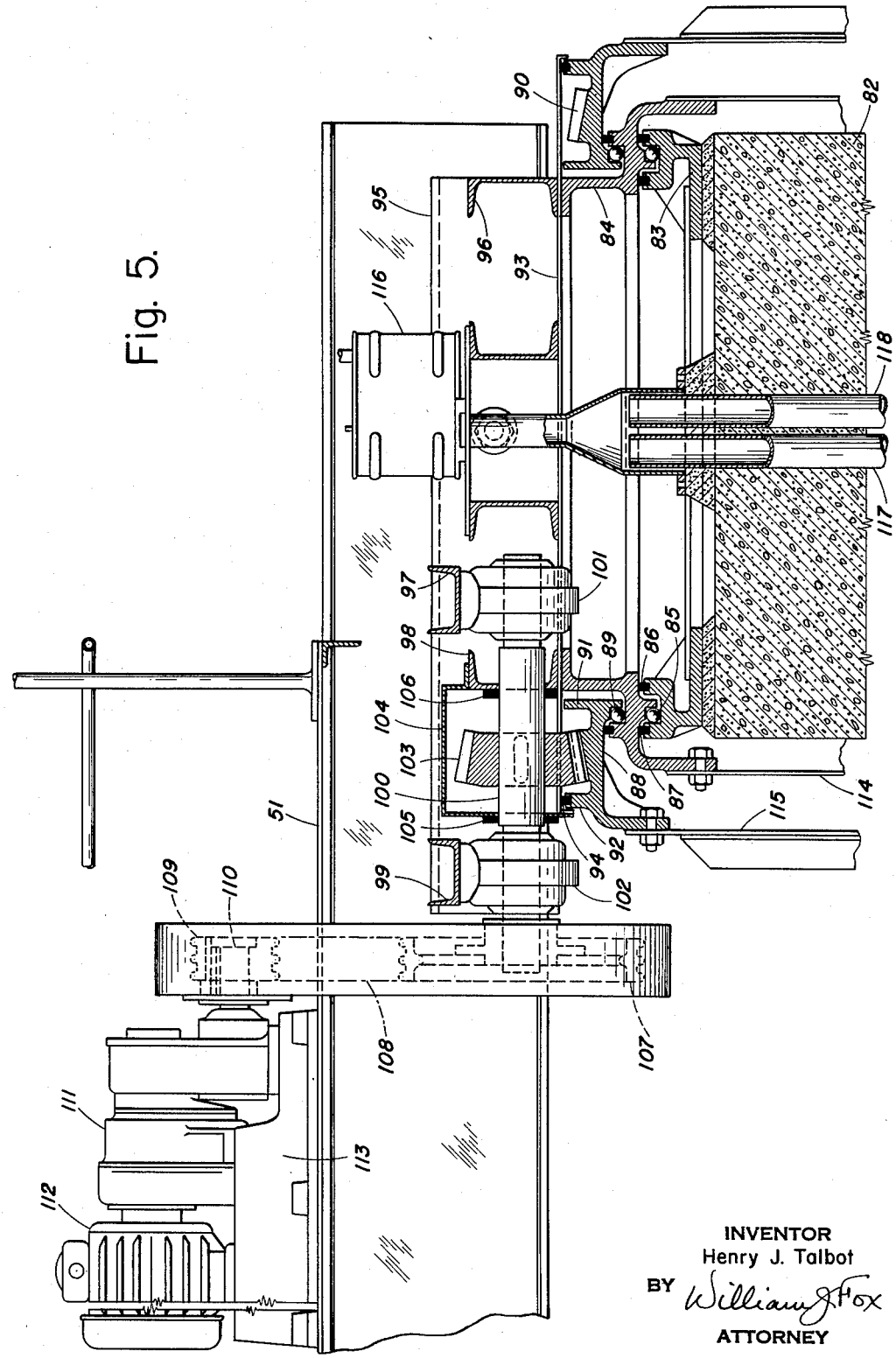

United States Patent Office 2,723,760
Patented Nov. 15, 1955

2,723,760

APPARATUS FOR DECLARIFICATION TREATMENT OF SOLIDS CARRYING LIQUIDS

Henry John Talbot, Horton Kirby, near Dartford, England, assignor to Dorr-Oliver Incorporated, Stamford, Conn., a corporation of Delaware Application October 30, 1952, Serial No. 317,700

1 Claim. (Cl. 210—55)

This invention relates to apparatus for the continuous clarification treatment of solids-carrying liquids by way of agitating or flocculating the suspended solids in an agitation zone followed by the settling of solids or flocs in a quiescent zone, where the solids-carrying feed liquid continuously enters the flocculation- or agitation zone and the clarified liquid overflows from the quiescent zone while sediment or settled flocs are being withdrawn from the apparatus as sludge. The softening treatment of water represents one field of application of such treatment, the treatment of sewage or waste liquids represents another. Softening treatment as a rule requires mechanical agitation, as by means of sets of vertical paddle elements moving in repetitive paths past each other; whereas waste liquid treatment requires agitation by means of aeration.

More in particular, this invention relates to improvements in a type of apparatus or tank unit for carrying out such clarification treatment, which holds a body of liquid functionally divided as by a cylindrical partition wall spaced from the tank bottom. This provides a central agitation or flocculation zone and an annular sedimentation zone surrounding the central zone, both zones being in hydraulic communication with each other at the tank bottom so that the liquid to be treated enters and descends in the central zone under agitation, thence to pass underneath the partition wall into the annular quiescent zone. The central zone is provided with agitating mechanism for effecting agitation treatment and aggregation of suspended solids as into the form of more readily settable flocs, and the liquid then flows outwardly radially in all directions from the central zone into the surrounding sedimentation zone to allow solids or flocs to settle on the tank bottom while clarified liquid overflows from the tank, as sediment is being collected by sludge raking mechanism and is removed from the tank botom as sludge.

In some respects this invention relates to improvements in the tank structure and associated rotary agitating mechanism and sediment raking mechanism as is exemplified in the British Patent No. 532,002 or the corresponding U. S. Patent No. 2,291,772.

The improved tank unit with its associated mechanism comprises a bottom supported cylindrical partition wall surrounding a central hollow pier up through which pier feeds the liquid to be treated, the pier serving to support a traction-driven truss arm which in turn has connected therewith outer sludge raking means operating upon the bottom of the annular settling zone, as well as inner raking means operating upon the bottom of the central zone. Vertical paddle agitator type mechanism operates in the central agitation-flocculation zone. The bottom of the central zone is depressed or stepped-down with respect to the bottom of the surrounding annular zone, so that the sediment being slowly raked inwardly in the annular sedimentation zone will transfer underneath the cylindrical partition and down the step to the bottom of the central zone where the inner sludge raking means convey the transferred sludge along with sediment from the agitation zone itself to a discharge sump provided at the foot end of the center pier. The inner sludge raking means are supported from the traction driven truss arm, to rotate therewith and thus at the same rotary speed as the outer raking means. That is, a cage or drum surrounding the center pier and rotating with the truss arm carries the inner sediment raking means or arms provided with sediment engaging blades.

In the case of water softening treatment, the inner sediment raking arms have thereon upstanding agitating paddle members moving unitary with and at the same slow rate as the sediment raking means. Coacting with these upstanding paddle members is a complementary rotary agitation structure concentric with the pier and in turn rotatably supported upon the cage or drum of the raking structure which latter in turn is rotatably supported upon the pier. The complementary agitating structure comprises horizontal arms extending within the top portion of the tank and having rigid sets of vertical paddle members coacting with the upstanding paddle members of the inner sludge raking means to the extent of vertical overlap between the upstanding and the depending paddle members. Indeed, the active depth of the flocculation zone is defined largely by the extent of vertical overlap between the respective sets of paddle members. However, between this active flocculation zone and the tank bottom there is established and interposed a relatively quiescent zone; in other words, the depending paddle members terminating a distance above the arms of the inner raking structure thereby define the effective upper limit of the interposed relative quiescent zone.

Independent drive means for the complementary agitating structure are provided in the form of a second motor carried by the truss arm for imparting to the complementary agitating structure that degree of rotating that will produce the desired flocculating effects upon the solids in suspension.

Figure 4 is a detailed section of the sediment discharge sump taken on lines 4—4 of Figure 3.

Figure 5 is an enlarged detail view of the top-end portion of the center pier of Figure 2, showing details of the associated rotary mechanism supported thereon.

Figure 1:
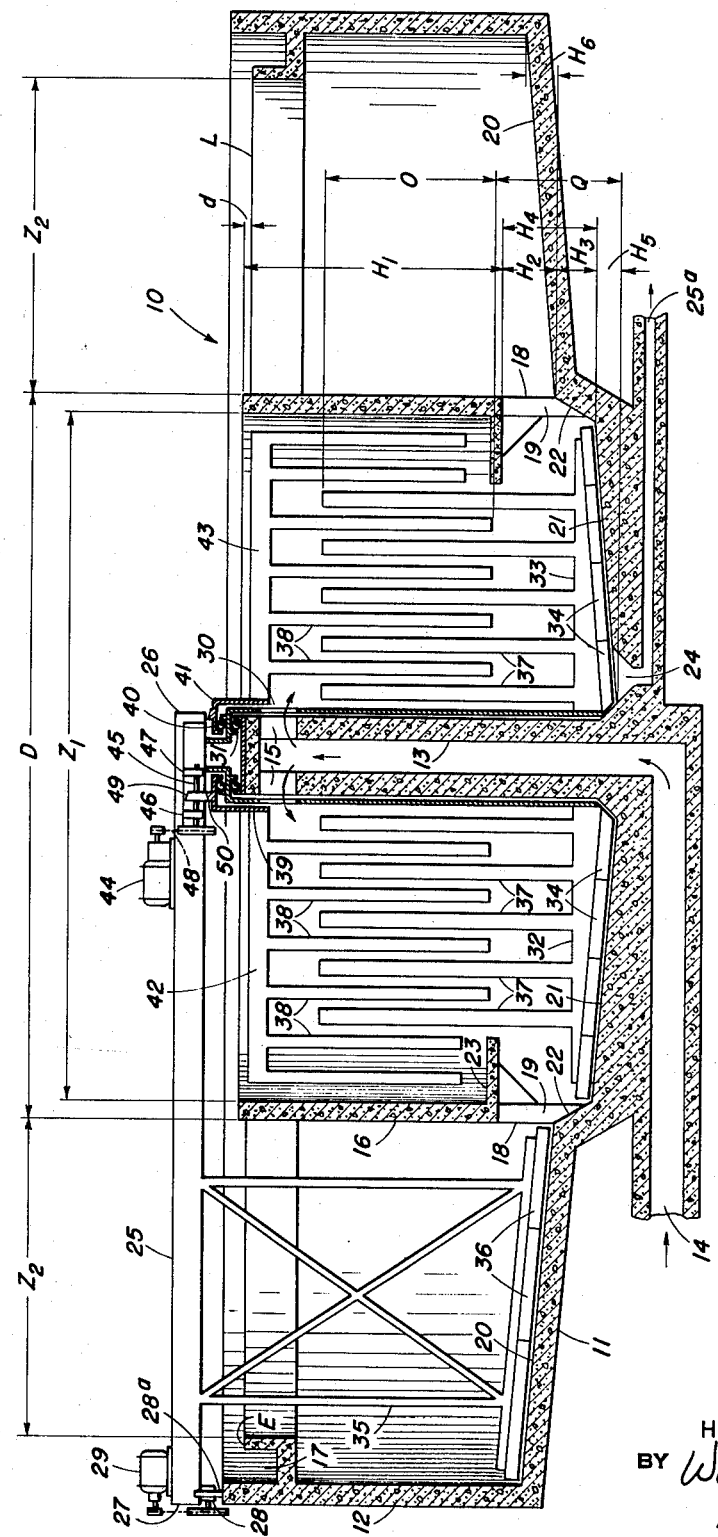
Figure 1 is a vertical section of the tank with the rotary sedimenting and flocculating mechanism shown in semi-diagrammatical fashion therein.

This invention is illustrated semi-diagrammatically in Figure 1 showing a tank 10 as of concrete comprising a bottom 11, a wall 12, and a central hollow pier 13; a feed conduit 14 underneath the tank supplies solids-carrying feed liquid to rise within the center pier to exit therefrom through openings 15 at the top end thereof; a cylindrical baffle wall 16 here also shown to be as of concrete surrounds the center pier concentrically therewith so as to define a central flocculating zone $Z_1$ within, and an annular sedimentation zone $Z_2$ surrounding the baffle wall 16.

The baffle wall 16 extends upwardly to a point which is a distance "$d$" above the liquid level "L" in the tank, which liquid level in turn is defined by the overflow edge "E" of a peripheral overflow launder 17 provided along the top end portion of the tank wall. The baffle wall 16 is supported upon the tank bottom by means of legs 18 also shown as of concrete and thus to be integral with the baffle wall 16 as well as with the tank bottom. The height of baffle wall 16 is designated as $H_1$ while the spacing of its bottom edge from the tank bottom is designated as $H_2$. The spacing $H_2$ of wall 16 from the tank bottom thus represents hydraulic communication as between the flocculation zone $Z_1$ and the sedimentation zone $Z_2$ by reason of flow passages 19 as defined by the distance $H_2$ and by the horizontal spacing of the supporting legs 18 from one another. The tank bottom comprises an outer or annular portion, namely the bottom portion 20 corresponding to the sedimentation zone $Z_2$, and a central or inner portion, namely the bottom portion 21 corresponding to the flocculation zone $Z_1$. The central bottom portion 21 constitutes a shallow depression with respect to the surrounding annular bottom portion 20, a transitional bottom portion being in the way of a step or steep slope bottom portion 22 of inverted frusto-conical shape, the depth of that step or depression being indicated as at $H_3$.

The legs 18 of baffle wall 16 are shown to rise vertically from the intermediate steep slope transitional bottom portion 22 so that the outer diameter D of the baffle wall 16 substantially coincides with the inner diameter of the annular bottom portion 21. The lower end of baffle wall 16 is formed with an inwardly extending annular bottom shelf 23 overhanging the central bottom portion 20 and spaced a distance $H_4$ therefrom. Both the central bottom portion 20 and the annular bottom portion 21 are shown to have a gentle or shallow inward slope designated as $H_5$ and $H_6$ respectively. A sludge discharge sump 24 is shown at the foot of the center pier, with a sludge discharge conduit 25ª leading therefrom.

The solids carrying feed liquid rising through the center pier 13 feeds into the top strata of the flocculation zone $Z_1$ to pass downwardly through a zone of agitation within the baffle wall 16, such zone being roughly defined by its height $H_1-d$; this liquid thence passes through a subjacent zone of relative quiescence directly above the bottom and substantially defined by the height Q where a quantity of relatively heavy solids and of flocculated matter may settle, with the balance of such matter being carried along with the liquid through transfer passage openings 19 into the bottom strata of the annular sedimentation zone $Z_2$ where additional solids of the lighter kind may settle while clarified liquid continues upwardly and outwardly into the overflow launder 17 for discharge therefrom. Simultaneously with such flow of liquid through the apparatus, slowly rotating raking mechanism is effective to convey settled solids from the annular tank bottom 21 inwardly towards the opening 19 for gravitation down the step 22 onto the central bottom 20 thence to be conveyed further inwardly by the raking mechanism towards the center pier 13 and eventually into the sump 24 for withdrawal therefrom. Certain flocculating means effective within the flocculation zone $Z_1$ are structurally and operatively associated in a certain manner with this slowly rotating raking mechanism. The raking mechanism together with its associated flocculating agitating means will now therefore be further described by reference to Figure 1.

The rotary raking mechanism comprises a horizontal traveling truss arm or member 25 having its inner end 26 mounted pivotally or rotatably upon the top of center pier 13, while its outer end 27 is supported for traveling upon the top of the tank wall 12. The truss arm itself is what is known as traction-driven, in that it is supported by a truck or the like indicated at 28, the wheel or wheels 28ª of which truck are driven as by a motor 29 mounted upon and carried by the truss arm at the outer end 27 thereof.

The inner end 26 of the truss arm 25 is connected to, and has rotating unitary therewith a drum or cage member 30 surrounding the center pier and extending from the top end to the foot end portion thereof, which cage member is rotatably supported upon the top end of the pier as is indicated by a vertical thrust bearing 31. The lower end of cage member 30 is provided with a pair of raking arms 32 and 33 each carrying at the underside thereof a set of plow-like sediment engaging blades 34 to pass over the central bottom portion 20 of the tank incident to the rotation of truss arm 25 for moving sediment towards the center pier and into sump 24.

The outer end portion 27 of the truss arm carries depending therefrom a structure 35 provided at the lower end thereof with a set of sediment engaging plow-like blades 36 which are similar to those carried by the raking arms 32 and 33, to move in repetitive circular paths over the annular bottom portion 20 incident to the rotation of truss arm 25 for moving sediment towards and into the passage openings 19 below the baffle wall 16.

The agitating means for the flocculation zone $Z_1$ comprises a set or sets of upstanding vertical paddle members 37 mounted upon the raking arms 32 and 33, as well as a set or sets of depending vertical paddle members 38 carried by a second turnable structure 39 rotatably mounted upon and concentric with the cage structure 30, as is indicated by a vertical thrust bearing 40. This second rotary structure 39 roughly comprises a short cage structure 41 surrounding the top end portion of the long cage structure 30, the short cage structure having a pair of horizontal arms 42 and 43 which carry rigid therewith the downwardly extending or depending paddle members 38. The upstanding paddle members 37 are spaced with respect to one another and with respect to the depending paddle members 38 in such a manner that upstanding paddle members alternate with depending paddle members as the depending members pass through respective spaces between upstanding members when the short cage member 41 is rotated relative to the long cage member 30. In order to effect such relative rotation at a desirable relative speed between respective sets of paddle members, a second motor 44 is provided upon and carried by the inner end 26 of truss arm 25. Drive means between motor 44 and short cage member 41 are diagrammatically indicated in the form of a countershaft 45 carried in and by a pair of bearings 46 and 47 and driven as by a ratio-reducing belt drive means 48 or the like, the countershaft 45 carrying a small bevel gear 49 meshing with a large bevel gear 50 provided fixedly upon the short cage structure 41.

The first drive motor 29 imparts to the truss arm 25 and thus to the rake arms 32 and 33 a relatively very slow rotary motion since that is all that is needed for the adequate movement of sediment over the tank bottom towards a point of discharge, whereas the second drive motor 44 imparts to the agitating arms 42 and 43 a relatively much faster motion. Indeed, it is a fair approximation to say that the upstanding paddle members are relatively stationary with respect to the depending paddle members, so that there may be discerned a zone or stratum of maximum and effective agitation the depth of which is substantially defined by the overlap O between the upstanding and the depending paddle members, whereas below that zone of agitation there exists the subjacent shallower zone or stratum Q of relative quiescence.

In this way, if one considers the solids carrying feed liquid entering the tank through the center pier and through the feed openings 15 at the top thereof, and clarified liquid passing from the tank by overflow into the launder 17, the solids carrying feed liquid upon entering the zone $Z_1$ becomes subjected to agitation and flocculating action while descending through the zone or deep stratum O where suspended flocculatable solids are formed into larger aggregates or flocs by a type and degree of agitation which must not be too mild and yet not too intense. From this zone or deep stratum O of active flocculation proper the now flocculated liquid descends further into and through the relatively quiescent zone Q where flocs or other solids of sufficient size or weight may settle directly to the central bottom portion 21 of the tank while a quantity of lighter solids or flocs are carried with the flow of liquid radially outwardly through the flow passages 19 into the annular clarification zone $Z_2$ where due to the diminishing flow velocities and quiescence they may settle to the annular bottom portion 20 of the tank even as clarified liquid reaches and passes out through the overflow launder 17.

With the liquid thus passing through the tank from the central pier to the overflow launder the truss arm 25 driven by motor 29 rotates slowly about the center pier upon its thrust bearing 31 and it has rotating with it the rake members 34 engaging whatever sediment they encounter upon the central bottom portion 21, the truss arm also having rotating with it the rake members 36 engaging whatever sediment they find upon the annular bottom portion 20. In this way the lighter and slower settling sediment from the outlying annular bottom portion is conveyed gradually into proximity of and reaches the passages 19 to gravitate down the step 22 onto the depressed bottom portion 21 so as to join the heavier sediment for the rake members 34 to convey the sediment mixture towards the pier and finally into the sump 24 for discharge through the conduit 25$^a$.

Together with truss arm 25 and with rake arms 32 also rotate the upstanding paddle members 37, but their rate of movement is relatively insignificant in the sense that adequate or relative quiescence still prevails in the zone of stratum Q which is subjacent to the agitated stratum O of active flocculation. Meanwhile, the turnable structure 39 upon its thrust bearing 40 is rotated at a relatively high rate of speed that is significantly higher than that of the truss arm 25, by means of motor 44 itself being carried slowly around upon and by the truss arm 25. The relative rates of rotation of the upstanding paddle members 37 and the depending paddle members 38 are such that the upstanding paddle members 37 might be considered for the present operational purpose as practically standing still whereas the depending paddle members 38 rotate at a rate of speed sufficient to produce the desired flocculating effects upon the suspended flocculatable solids as the depending paddle members move relative to the upstanding paddle members within the zone or deep stratum Q defining the vertical overlap of the respective sets of paddle members.

Figures 2, 3, 4 and 5 present the apparatus of Figure 1 structurally more fully developed, pertaining mainly to the flocculating and sedimenting mechanism.

Figure 2:
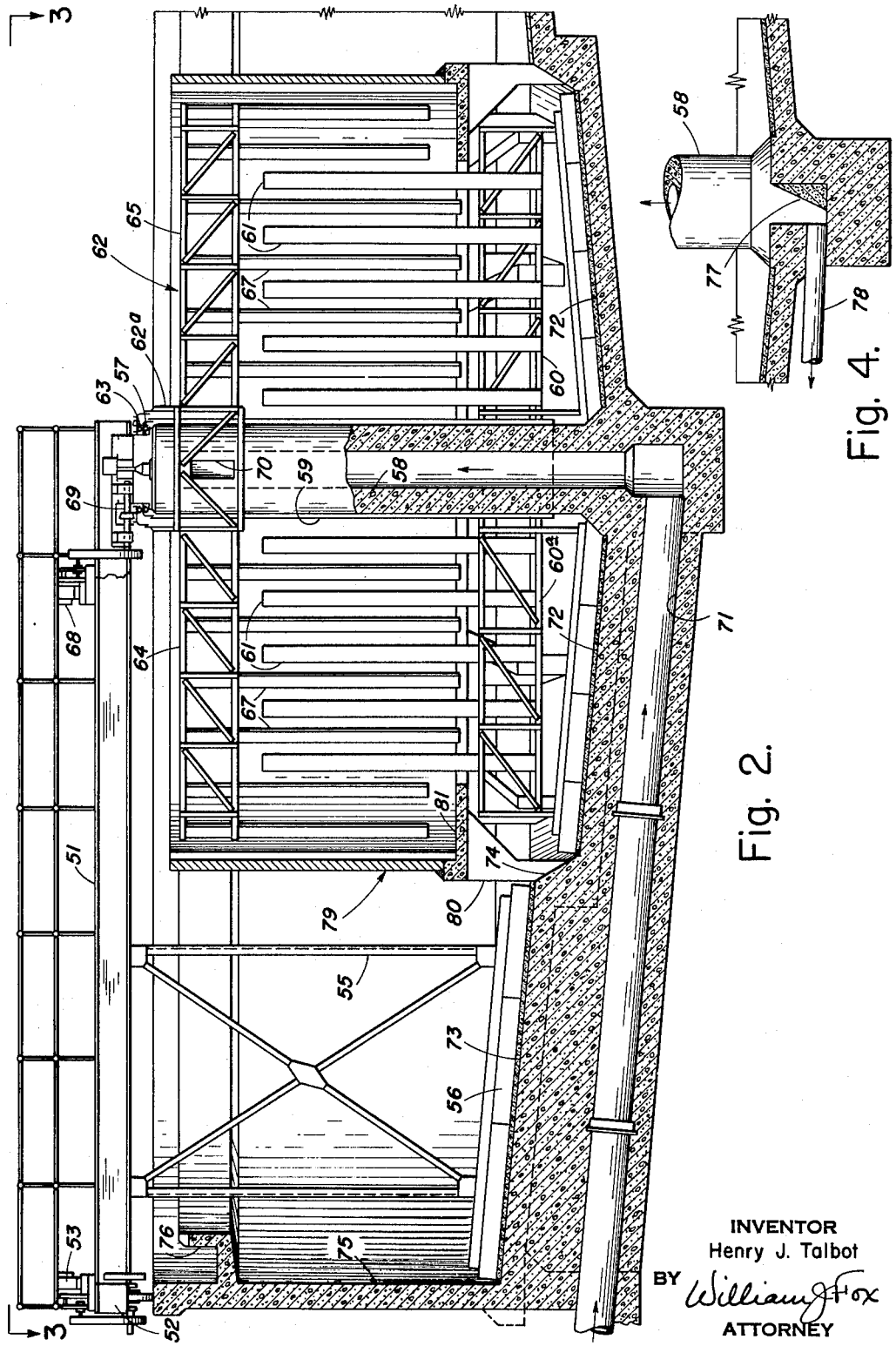
Figure 2 is a somewhat enlarged and structurally more fully executed rendition of the apparatus shown in Figure 1.
Figure 3:
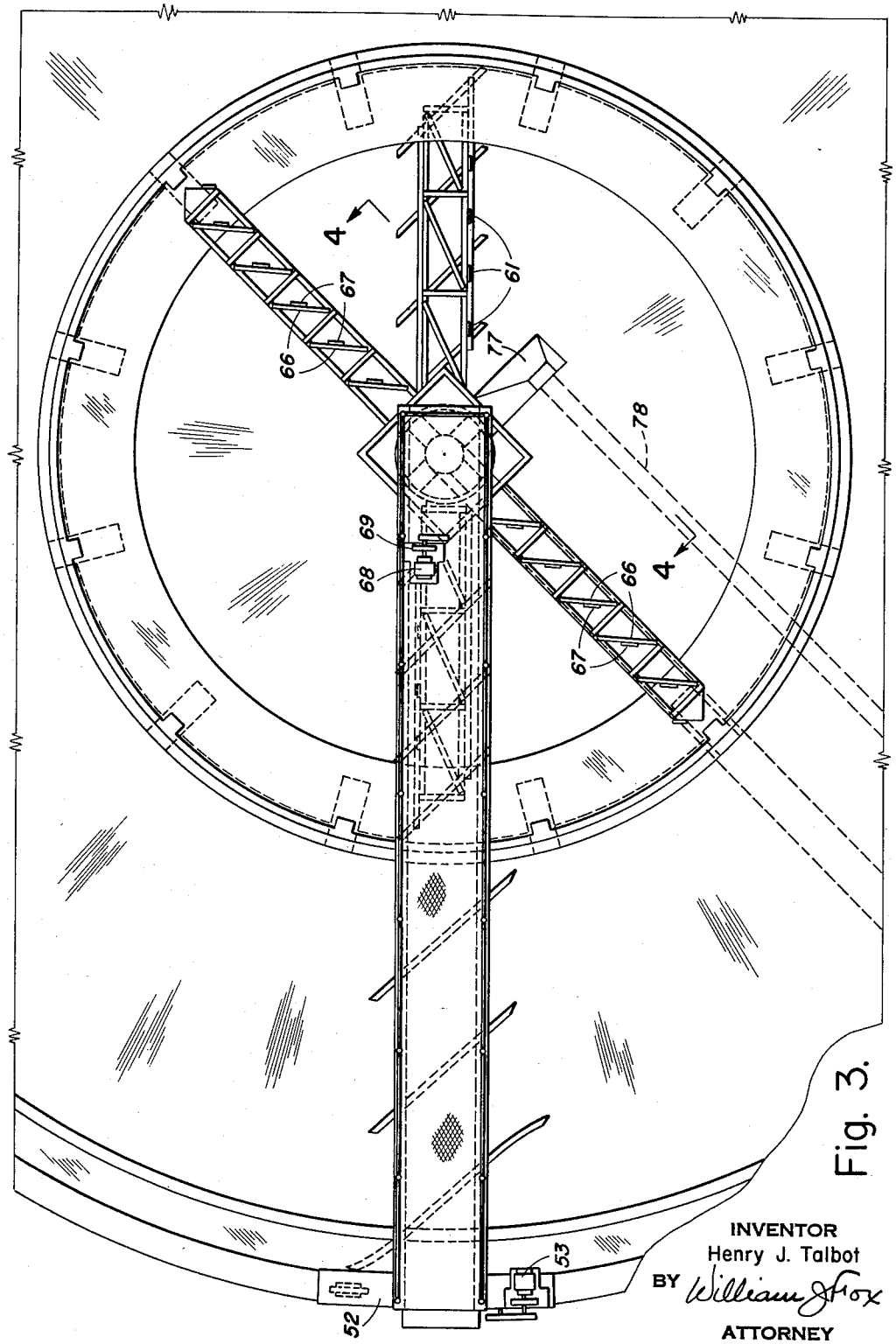
Figure 3 is a plan view of the apparatus shown in Figure 2, where the flocculating mechanism comprises a pair of fast rotating flocculating arms with upstanding paddle members and a pair of slow moving rake arms with upstanding paddle members.

In Figures 2 and 3 the truss arm 51 (which corresponds to truss arm 25 of Figure 1) is shown to have its outer end supported upon a two-wheeled truck 52, the one truck wheel being driven by a motor 53 which is mounted upon the truck itself, the other truck wheel being an idler. Such a truck may ride upon a circular rail usually provided upon the top of the tank wall. The truss arm 51 has depending from it a frame 55 provided with sediment engaging blade members 56 (the same as frame 35 and blade members 36 of Figure 1) to serve the annular bottom portion where the lighter solids settle in the outer annular clarification zone. The inner end of truss arm 51 has a vertical thrust bearing 57 (corresponding to thrust bearing 31 of Figure 1) upon the top of the center pier 58, and it also has a cage member 59 surrounding center pier 58, (corresponding to a similar cage member 30 in Figure 1). The rake arms 32 and 33 of Figure 1, however, take the form of truss arms 60 and 60$^a$ in Figures 2 and 3, a set of upstanding paddle members 61 being shown as fastened flat against a respective side of each of these truss arms 60 and 60$^a$.

The turnable structure (corresponding to structure 39 of Figure 1) to effect flocculation is designated by numeral 62 in Figure 2, that structure being supported by a thrust bearing 63 (which corresponds to thrust bearing 40 of Figure 1), upon the slow rotating cage 59. Again, what are the arms 42 and 43 in Figure 1 take the form of truss arms 64 and 65 in Figure 2, such truss arms comprising horizontal diagonal members 66 at the top (see Figure 3) to which are fastened depending vertical paddle members 67. The truss arms 64 and 65 extend from and are carried by the short cage member 62$^a$ which corresponds to the short cage member 41 of Figure 1, and which in turn is rotatably supported upon the vertical thrust bearing 63 corresponding to thrust bearing 40 of Figure 1. A motor 68 and drive transmitting means 69 between it and the turnable structure 62 are indicated to appear substantially the same as corresponding parts in Figure 1.

The tank structure itself is substantially identical to that of Figure 1, having a hollow pier 58 with its feed openings 70 and feed conduit 71. The center pier 58 rises from the tank bottom which itself comprises a central depressed portion 72 and an outer annular portion 73, a steep sloped portion or step 74 transitional between portions 72 and 73 and a tank wall 75 provided with peripheral overflow launder 76. A sediment discharge sump 77 is shown at the foot of the center pier, with sludge discharge conduit indicated at 78. The flocculation zone or compartment (indicated at $Z_1$ in Figure 1) is similarly shown as a cylindrical portion or wall 79 supported upon the tank bottom by concrete posts or legs 80 formed with an annular shelf 81, the wall 79 itself being built up upon the shelf as by bricks or other composite structure.

The manner of supporting the rotary sediment-raking and flocculating mechanism with respect to the center pier (somewhat diagrammatically shown in Figure 1) is shown in greater detail in Figure 5, that figure representing a detailed enlargement of the corresponding portion of the apparatus shown in Figure 2.

Accordingly, the center pier here designated as 82 has mounted upon its top face an annular stationary casting or bearing raceway member 83 upon which operates a companion rotary member 84 also in the form of an annular casting and provided with such anti-fraction elements, balls 85 between the members 83 and 84 to constitute what in Figure 2 is indicated as the vertical thrust bearing 57, dust seals for the bearing being indicated as 86 and 87. The second or intermediate raceway member 84 is formed with a second raceway at the top so that it may have rotatable thereon a third or top raceway member 88 rotatable upon the intermediate raceway member as through balls 89 to constitute what in Figure 2 is indicated as the vertical thrust bearing 63. The top raceway member 88 is formed at the top thereof with a large bevel gear 90 as well as with a pair of concentric annular ridge portions 91 and 92 to constitute an annular depression or trough to contain the bevel gear 90.

A cover plate is fastened to the intermediate rotary member 84 in a manner so dimensioned as to overhang the top raceway member 88 which latter in turn employs the outer ridge portion 92 to provide a seat for an oil and dust seal 94 contacting the under side of the overhang of cover plate 93.

The inner end of truss arm 51 is fastened to and supported through the cover plate 93 upon the intermediate rotatable raceway member 84. Drive transmitting mechanism is mounted upon the inner end of the truss arm 51 or upon cover plate 93 respectively as is indicated by various structural members 95, 96, 97, 98 and 99. The drive transmitting mechanism or means comprise a horizontal countershaft 100 supported in and by a pair of bearing blocks 101 and 102 fastened to the under side of structural members 97 and 99 which in turn have rigid connection with the truss arm 51. A small bevel gear 103 is fixedly mounted upon the countershaft 100 and is disposed intermediate the bearing blocks 101 and 102, to mesh with the large bevel gear 90 below. A protective housing 104 surrounds the small bevel gear 103 and is shown to be fastened to the structural member 98 with a pair of dust seals 105 and 106 being provided to be effective between the countershaft 100 and the housing 104.

The countershaft 100 has fixed upon its outer free end a large pulley 107 which may be in the form of a grooved sheave engaged by an endless flexible drive transmitting element 108 driven by a small pulley 109 fastened upon the free end of the output shaft 110 of a reduction gear unit 111 driven by a motor 112. The reduction gear unit 111 and the motor 112 are shown to have a common base or base casting 113 whereby they are mounted atop the truss arm 51. It will be understood that the mechanism in Figure 5 so far described corresponds to the mechanism which is more diagrammatically indicated in Figure 2 by numerals 68 and 69.

It will be seen from Figure 5 that when the truss arm 51 rotates at a slow rate due to the driving power of motor 53 (see Figure 2) it will rotate bodily therewith the intermediate raceway member 84 which in turn carries to rotate therewith a long cage member 114 (corresponding to cage member 59 of Figure 2) to rotate the arms 60 and 60ª together with their upstanding paddle member 61 also at a slow rate. The drive motor 112 itself is carried along slowly by the rotating truss arms 51 and through bevel gears 103 and 90 it rotates the top raceway member 88 and its short cage member 115 (which corresponds to short cage member 62ª of Figure 2) and thus the arms 64 and 65 of turnable flocculating structure 62.

It will be understood that even though the rotation of the truss arm 51 may be stopped temporarily, the turnable flocculating structure 62 may nevertheless be kept going, or vice versa. The drive for the flocculating structure may be temporarily stopped, while the truss arm 51 is kept going. At any rate, the drive motors 63 and 68 (of Figure 2) both have power supplied thereto by way of a slide contact device or contact unit 116 (see Figure 5) supplied by electric power cable leading from underneath the tank up through the center pier, as indicated by the cable casings 117 and 118.

I claim:

A tank for the continuous clarification of liquids in which the raw liquid feeds into a centrally disposed agitated flocculation compartment to effect flocculation of suspended solids into settable form and where the floc carrying liquid passes radially outwardly in all directions from said flocculation compartment into a quiescent annular clarification compartment surrounding said flocculation compartment, and where flocs settle upon the tank bottom while allowing clarified liquid to pass from the tank by way of overflow means, there being provided in the tank a center pier through which raw liquid passes upwardly from underneath the tank into the top portion of the flocculation compartment, a cylindrical partition defining said compartments concentric with said pier, said partition being supported on and spaced from the tank bottom to provide bottom passages circumferentially along the foot end of said partition for liquid to pass from said flocculation compartment into said clarification compartment, there being further provided a rake carrying horizontal truss arm rotatably supported upon the pier and traction-driven upon the tank wall for raking settled flocculated matter in said clarification compartment as sludge inwardly to a zone of collection and withdrawal, together with pier supported agitator structure provided in the flocculation compartment to revolve about said pier and comprising a set of upstanding vertical paddle members coacting with a set of depending vertical paddle members which sets of paddle members move relative to each other and in concentric paths about said center pier, one set of paddle members moving at relatively low speed unitary with said truss member while the other set is separately driven to move at a relative angular speed greater than that of said truss; characterized thereby that the bottom of the flocculation compartment constitutes a shallow bottomed central depression relative to the bottom of the surrounding annular clarification compartment for sludge to transfer therefrom gravitationally through said passages into said depression for withdrawal therefrom, and that there is provided flocculation inducing mechanism operating in said flocculation compartment and comprising a cage structure surrounding said pier and unitary with said truss arm to rotate therewith, a plurality of sludge raking arms extending from the bottom end of said cage structure to convey sludge to a zone of discharge in said flocculation compartment, each said sludge raking arm having a row of upstanding paddle members, and that an agitating structure is rotatably mounted upon and surrounding said cage structure for rotation relative thereto and comprising a plurality of agitator arms each provided with a row of depending vertical paddle members adapted to coact said upstanding baffle members to effect flocculation to a depth substantially determined by the extent of overlap between the upstanding and the depending baffle members, said depending baffle members terminating at an elevation spaced from said sludge raking arms therebelow and thus defining a zone of relative quiescence subjacent the flocculation zone proper whereby a quantity of flocculated matter is adapted to settle directly upon and in said shallow depression while floc-carrying liquid passes radially from said subjacent relatively quiescent zone through said passages into said clarification zone, and that drive means are mounted upon said truss arm for rotating said agitator structure.

References Cited in the file of this patent

UNITED STATES PATENTS

| | | |
|---|---|---|
| 2,289,112 | Fischer | July 7, 1942 |
| 2,291,772 | Talbot et al. | Aug. 4, 1944 |
| 2,532,457 | Morgan et al. | Dec. 5, 1950 |
| 2,647,869 | Kelly | Aug. 4, 1953 |